United States Patent Office 2,874,183
Patented Feb. 17, 1959

2,874,183

UNSATURATED ALDEHYDES AND PROCESS FOR THE PREPARATION OF SUCH COMPOUNDS

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application August 10, 1955
Serial No. 527,644

Claims priority, application Switzerland August 16, 1954

12 Claims. (Cl. 260—488)

The subject matter of the present invention is a method of preparing 2,6,6-trimethylcyclohexen-(1)-yl-acetaldehyde, 2,6,6-trimethylcyclohexadien-(1,3)-yl-acetaldehyde, 4-[2',6',6'-trimethylcyclohexen-(1')-yl]-2-methyl - buten - (2)-al-(1) and 4-[2',6',6'-trimethylcyclohexadien-(1',3')-yl]-2-methyl-buten-(2)-al-(1), which in the following will be called β-$C_{11}$-aldehyde, β-dehydro-$C_{11}$-aldehyde, β-$C_{14}$-aldehyde and β-dehydro-$C_{14}$-aldehyde, respectively.

The process is characterized by the fact that the 2,6,6-trimethylcyclohexylidene-acetaldehyde or 4-[2',6',6'-trimethylcyclohexylidene]-2-methyl-buten-(2)-al-(1) or the analogous compounds unsaturated in the 2,3-position is converted into the enolester and the latter hydrolyzed under mild conditions.

The starting materials of the process can be prepared as follows:

2,6,6-TRIMETHYLCYCLOHEXYLIDENE - ACETALDEHYDE (ISO-$C_{11}$-ALDEHYDE)

The ethoxyacetylene carbinol obtained by the condensation of ethoxyacetylene with 2,6,6-trimethylcyclohexanone-(1) is partially hydrogenated in the known manner at the triple bond and treated with acid; colorless oil; B. P.$_{.12}$=110° C.; $n_D^{25}$=1.496; ultraviolet maximum: 237–238 m$\mu$ (in petroleum ether) (see copending application Ser. No. 479,217, filed December 31, 1954, now Patent No. 2,798,095).

2,6,6 - TRIMETHYLCYCLOHEXEN - (2) - YLIDENE-ACETALDEHYDE (RETRODEHYDRO-$C_{11}$-ALDEHYDE)

The ethoxyacetylene carbinol obtained by condensation of ethoxyacetylene and 2,6,6-trimethylcyclohexen-(2)-one-(1) is partially hydrogenated in the known manner at the triple bond and treated with acid; yellowish oil; B. P.$_{.12}$=115° C.; $n_D^{25}$=1.531; ultraviolet maximum: 278 m$\mu$ (in petroleum-ether solution) (see copending application Ser. No. 479,217, filed December 31, 1954).

4 - [2',6',6' - TRIMETHYLCYCLOHEXYLIDENE]-2 - METHYL - BUTEN - (2) - AL - (1) (ISO - $C_{14}$-ALDEHYDE)

The aforementioned iso-$C_{11}$-aldehyde is acetalized, the acetal obtained is condensed with a propenylether in the presence of an acid condensation agent, and the condensation product formed is treated with acid (see copending application Ser. No. 527,643, filed August 10, 1955).

The iso-$C_{14}$-aldehyde can also be obtained by condensing 2,6,6-trimethylcyclohexanone-(1) by a Grignard reaction with 2-methyl-1-methoxy-2-oxy-butine-(3), partially hydrogenating at the triple bond the acetylene glycol obtained and dehydrating the ethyleneglycol formed and treating it with acid.

Yellowish oil; B. P.$_{.0.05}$=82 to 84° C.; ultraviolet maximum: 288 m$\mu$ (in petroleum-ether solution).

4 - [2',6',6' - TRIMETHYLCYCLOHEXEN - (2) - YLIDENE] - 2 - METHYL - BUTEN - (2) - AL - (1) (RETRODEHYDRO-$C_{14}$-ALDEHYDE)

The above mentioned retrodehydro-$C_{11}$-aldehyde is acetalized, the acetal obtained is condensed with a propenylether in the presence of an acid condensation agent, and the condensation product obtained is treated with acid (see copending application Ser. No. 527,643, filed August 10, 1955).

The retrodehydro-$C_{14}$-aldehyde can also be obtained by condensing β-ionone by a glycide ester reaction with ethylchloro-acetate, subjecting the glycide ester obtained to alkaline saponification, brominating the 4-[2',6',6'-trimethylcyclohexen - (1') - yl] - 2 - methyl - buten - (2)-al-(1) with N-bromosuccinimide and splitting off hydrogen bromide from the bromination product obtained by means of quinoline. Yellow oil; B. P.$_{.0.05}$=94° C.; $n_D^{24}$=1.610; ultraviolet maximum: 318 m$\mu$ (in petroleum-ether solution).

In the first step of the process in accordance with the invention, the initial aldehyde is converted into an enolester. This is done in a known manner. For instance, the starting material can be treated with lower aliphatic carboxylic acid anhydrides in the presence of acid condensation agents such as p-toluenesulfonic acid, zinc chloride, etc., or of alkali- or alkali-earth salts of the corresponding acids. The initial aldehyde can also be treated in the presence of acid condensation agents with an enolester of a ketone having a lower boiling point than the initial aldehyde, in which connection, by the continuous removal of the ketone from the reaction mixture, the enolester of the initial aldehyde is produced. In the preferred embodiment of the invention, the iso-$C_{11}$- or retrodehydro-$C_{11}$- or iso-$C_{14}$- or retrodehydro-$C_{14}$-aldehyde respectively is heated with acetic anhydride in the presence of p-toluenesulfonic acid or sodium acetate, or is heated at 100 to 140° C. with isopropenylacetate in the presence of p-toluenesulfonic acid, continuously distilling off the acetone which is released. In this manner there is obtained substantially pure enolesters in almost quantitative yield in the form of colorless to yellowish oils which show characteristic absorption maxima in the ultraviolet spectrum. For the further use, a special purification, for instance by distillation, is not necessary.

The second step of the process in accordance with the invention consists in hydrolyzing the enolesters of the initial aldehydes under mild conditions. This is done in the known manner in an aqueous medium. For this purpose there are particularly well suited the alkali and alkali-earth hydroxides, -carbonates or -bicarbonates. A water-miscible solvent such as methyl alcohol, ethyl alcohol, dioxane, etc., can be added to the reaction mixture in order to obtain a homogeneous reaction mixture. The enolesters are preferably boiled for 10 to 15 hours with sodium bicarbonate in 90% aqueous methyl alcohol.

The aldehydes obtained in accordance with the present process are distillable oils which have characteristic absorption maxima in the ultraviolet spectrum.

PHENYLSEMICARBAZONES OF THE ALDEHYDES

| | Melting point, ° C. | Ultraviolet absorption maxima in petroleum-ether solution | |
|---|---|---|---|
| | | Milli-microns | $E_1^1$ |
| β-$C_{11}$-aldehyde | 157–159 | 248 | 805 |
| β-dehydro-$C_{11}$-aldehyde | 158–160 | 248 | 712 |
| β-$C_{14}$-aldehyde | 178–179 | 237; 276 | 600; 1,065 |
| β-dehydro-$C_{14}$-aldehyde | 180–192 | 236; 282 | 635; 1,170 |

The β-$C_{11}$-aldehyde and the β-$C_{14}$-aldehyde are valuable intermediates for the synthesis of vitamin A and β-carotene. The β-dehydro-$C_{11}$-aldehyde and the β-dehydro-$C_{14}$-aldehyde are intermediates for the synthesis of vitamin $A_2$ and of carotenoids (see copending application Ser. No. 553,214, filed December 15, 1955 and now abandoned).

Example 1

ENOLACETATE OF ISO-C₁₁-ALDEHYDE 50 parts by weight of 2,6,6-trimethylcyclohexylidene-acetaldehyde are boiled for 2 hours under reflux with 150 parts by volume acetic anhydride and 30 parts by weight fused sodium acetate. The reaction solution is then poured into a mixture of 200 parts by weight of ice and 200 parts by volume of water, extracted with petroleum-ether, whereupon the petroleum-ether solution is washed with water and dried over sodium sulfate. After the solvent has been evaporated off, the residue is distilled in vacuum. There are obtained 55 parts by weight 2-[2',6',6'-trimethylcyclohexen-(1')-yl]-1-acetoxy-ethylene. B. P.$_{13}$=115 to 120° C.; $n_D^{27}$=1.486; ultraviolet absorption maximum at 232 m$\mu$;

$$E_1^1 = 320$$

(in petroleum-ether solution).

β-C₁₁-ALDEHYDE

To 55 parts by weight 2-[2',6',6'-trimethylcyclohexen-(1')-yl]-1-acetoxy-ethylene, there are added 300 parts by volume methyl alcohol, 30 parts by volume of water and 23 parts by weight sodium bicarbonate and the reaction mixture is heated for 10 hours under reflux with agitation. Thereupon it is diluted with 700 parts by volume of icewater and slightly acidified with dilute sulfuric acid. The reaction product is extracted with petroleum-ether, washed with sodium bicarbonate solution and dried over sodium sulfate. After the solvent has been distilled off, the residue is distilled in vacuum. There are obtained 40 parts by weight 2,6,6-trimethylcyclohexen-(1)-yl-acetaldehyde. B. P.$_{12}$=98° C.; $n_D^{27}$=1.480. The substance does not have any absorption maximum over 220 m$\mu$ in the ultraviolet spectrum.

Example 2

ENOLACETATE OF RETRODEHYDRO-C₁₁-ALDEHYDE

A mixture of 10 parts by weight 2,6,6-trimethylcyclohexen-(2)-ylidene-acetaldehyde, 20 parts by volume acetic anhydride and 0.1 part by weight p-toluenesulfonic acid are heated at 95° C. for 90 minutes. Thereupon it is cooled to 20 to 30° C. and poured into a mixture of 20 parts by weight ice and 30 parts by volume water. The oily reaction product is extracted with petroleum-ether, washed with sodium bicarbonate solution and with water and dried over sodium sulfate. After the concentration of the petroleum-ether solution, the residue is distilled in vacuum. There are obtained 10 parts by weight 2-[2',6',6'-trimethylcyclohexadien-(1',3')-yl]-1-acetoxy-ethylene, B. P.$_{12}$=115° C.; $n_D^{24}$=1.505; ultraviolet absorption maximum at 284 m$\mu$;

$$E_1^1 = 340$$

(in petroleum-ether solution).

β-DEHYDRO-C₁₁-ALDEHYDE

To a solution of 6.8 parts by weight 2-[2',6',6'-trimethylcyclohexadien-(1',3')-yl]-1-acetoxy-ethylene in 100 parts by volume ethyl alcohol there are added 10 parts by volume 20% aqueous caustic potash solution and set aside for 5 hours at 20 to 25° C. Thereupon the reaction solution is diluted with 100 parts by volume of water and slightly acidified with 10% sulfuric acid. The reaction product is extracted with petroleum-ether, washed with water and dried over sodium sulfate, and the solvent is evaporated. The residue is distilled in vacuum and there are obtained 4.9 parts by weight 2,6,6-trimethyl-cyclohexadien-(1,3)-yl-acetaldehyde, B. P.$_{12}$=105 to 110° C.; $n_D^{24}$=1.499; ultraviolet absorption maximum at 267 m$\mu$;

$$E_1^1 = 315$$

(in petroleum-ether solution).

Example 3

ENOLACETATE OF ISO-C₁₄-ALDEHYDE 9 parts by weight 4-[2',6',6'-trimethylcyclohexylidene]-2-methyl-buten-(2)-al-(1) are heated with 6.5 parts by volume isopropenylacetate and 0.045 part by weight p-toluenesulfonic acid for 3 hours at 110 to 130° C., the acetone produced being slowly distilled off from the reaction mixture. After cooling, the reaction solution is poured into a mixture of 10 parts by weight of ice and 10 parts by volume of water. The reaction product is extracted with petroleum-ether, the petroleum-ether solution is washed with sodium bicarbonate solution and with water and dried over sodium sulfate. After the solvent has been distilled off, there are obtained 10.4 parts by weight of crude 4-[2',6',6'-trimethylcyclohexen-(1')-yl]-2-methyl-1-acetoxy-butadiene-(1,3), which is sufficiently pure for the further treatment. By distillation in vacuum, there can be obtained a colorless product; B. P.$_{0.05}$=110° C.; $n_D^{24}$=1.522; ultraviolet absorption maximum at 264 m$\mu$;

$$E_1^1 = 690$$

(in petroleum-ether solution).

β-C₁₄-ALDEHYDE 10.4 parts by weight 4-[2',6',6'-trimethylcyclohexen-(1')-yl]-2-methyl-1-acetoxy-butadiene-(1,3) are saponified, as indicated in Example 2, with 100 parts by volume of ethyl alcohol and 13 parts by volume of 20% aqueous caustic potash solution and worked up. Upon distillation in a high vacuum there are obtained 7.5 parts by weight of 4-[2',6',6'-trimethylcyclohexen-(1')-yl]-2-methyl-buten-(2)-al-(1); B. P.$_{0.05}$=86° C.; $n_D^{24}$=1.509; ultraviolet absorption maximum at 226 m$\mu$;

$$E_1^1 = 840$$

(in petroleum-ether solution).

Example 4

β-DEHYDRO-C₁₄-ALDEHYDE 136 parts by weight 4-[2',6',6'-trimethylcyclohexen-(2)-ylidene]-2-methyl-buten-(2)-al-(1) are heated with 97 parts by volume isopropenyl acetate and 0.7 parts by weight p-toluenesulfonic acid for 3 to 4 hours at 100 to 140° C. while passing through a weak stream of nitrogen, the acetone released being continuously distilled out of the reaction mixture. Thereupon it is allowed to cool. The crude 4-[2',6',6'-trimethylcyclohexadien-(1',3')-yl]-2-methyl-1-acetoxy-butadiene-(1,3), thus obtained is directly hydrolyzed. For this purpose there are added 650 parts by volume methyl alcohol, 65 parts by volume water and 46 parts by weight sodium bicarbonate and the mixture is boiled while agitating for 12 hours under reflux. It is then poured onto 2000 parts by volume of icewater, and slightly acidified with dilute sulfuric acid. The reaction product is extracted with petroleum-ether, washed with sodium bicarbonate solution and dried over sodium sulfate. After the solvent has been evaporated, the residue is distilled in a high vacuum. There are obtained 98 parts by weight 4-[2',6',6'-trimethylcyclohexadien-(1',3')-yl]-2-methyl-buten-(2)-al-(1); B. P.$_{0.05}$=80° C.; $n_D^{22}$=1.530; ultraviolet absorption maxima at 224 and 268 m$\mu$;

$$E_1^1 = 795 \text{ and } 345$$

(in petroleum-ether solution).

We claim:
1. A process which comprises reacting a member of the group consisting of 2,6,6-trimethylcyclohexylidene-acetaldehyde, 2,6,6-trimethylcyclohexen-(2)-ylidene-acetaldehyde, 4-[2',6',6-trimethylcyclohexylidene]-2-methyl-buten-(2)-al-(1) and 4-[2',6',6'-trimethylcyclohexen-(2)-ylidene]-2-methyl-buten-(2)-al-(1) with a member of the group consisting of lower aliphatic carboxylic acid anhydride and enol ester of a ketone having a lower boiling point than the starting aldehyde in the presence of an acid condensation agent to produce, respectively, a member of the group consisting of 2 - [2',6',6' - trimethylcyclohexen - (1') - yl] - 1 - acyloxy - ethylene, 2 - [2',6',6' - trimethylcyclohexadien - (1',3') - yl] - 1 - acyloxy - ethylene, 4 - [2',6',6'-trimethylcyclohexen - (1') - yl] - 2 - methyl - 1 - acyloxy-butadiene - (1,3) and 4 - [2',6',6'-trimethylcyclohexadien - (1',3') - yl] - 2 - methyl - 1 - acyloxy - butadiene-(1,3) and hydrolyzing the enol esters thus obtained under mild conditions in aqueous medium to produce, respectively, a member of the group consisting of 2,6,6-trimethylcyclohexene - (1) - yl - acetaldehyde, 2,6,6-trimethylcyclohexadien - (1,3) - yl - acetaldehyde, 4-[2',6',6' - trimethylcyclohexene - (1') - yl] - 2 - methyl-buten - (2) - al - (1) and 4 - [2',6',6' - trimethylcyclohexadien - (1,3') - yl] - 2 - methyl - buten - (2) - al - (1).

2. A process as in claim 1 wherein the enol ester is isopropenylacetate and the acid condensation agent is p-toluene-sulfonic acid.

3. A process as in claim 1 wherein the anhydride is acetic anhydride and the acid condensation agent is sodium acetate.

4. A process which comprises hydrolyzing 2-[2',6',6'-trimethylcyclohexen-(1')-yl]-1-acyloxy-ethylene in aqueous medium under mild conditions to produce 2,6,6-trimethylcyclohexen-(1)-yl-acetaldehyde.

5. A process which comprises hydrolyzing 2-[2',6',6'-trimethylcyclohexadien-1',3')-yl]-1-acyloxy-ethylene in aqueous medium under mild conditions to produce 2,6,6-trimethylcyclohexadien-(1,3)-yl-acetaldehyde.

6. A process which comprises hydrolyzing 4-[2',6',6'-trimethylcyclohexen - (1') - yl] - 2 - methyl - 1 - acyloxy-butadiene-(1,3) in aqueous medium under mild conditions to produce 4 - [2',6',6' - trimethylcyclohexen-(1')-yl]-2-methyl-buten-(2)-al-(1).

7. A process which comprises hydrolyzing 4-[2',6',6'-trimethylcyclohexadien - (1',3') - yl] - 2 - methyl - 1 - acyloxy-butadiene-(1,3) in aqueous medium under mild conditions to produce 4 - [2',6',6'-trimethylcyclohexadien-(1',3')-yl]-2-methyl-buten-(2)-al-(1).

8. A compound of the group consisting of 4-[2',6',6'-trimethylcyclohexen - (1') - yl] - 2 - methyl - 1 - lower alkanoyloxybutadiene - (1,3) and 4 - [2',6',6' - trimethylcyclohexadien - (1',3') - yl] - 2 - methyl - 1 - lower alkanoyloxy-butadiene-(1,3).

9. 4 - [2',6',6' - trimethylcyclohexen - (1') - yl] - 2-methyl-1-lower alkanoyloxy-butadiene-(1,3).

10. 4 - [2',6',6' - trimethylcyclohexadien - (1',3')-yl]-2-methyl-1-lower alkanoyloxy-butadiene-(1,3).

11. 4 - [2',6',6' - trimethylcyclohexen - (1') - yl]-2-methyl-1-acetoxy-butadiene-(1,3).

12. 4 - [2',6',6' - trimethylcyclohexadien - (1',3')-yl]-2-methyl-1-acetoxy-butadiene-(1,3).

References Cited in the file of this patent
UNITED STATES PATENTS 2,466,737    Quattlebaum et al. _____ Apr. 12, 1949

FOREIGN PATENTS 638,940    Germany _____ Nov. 25, 1936

OTHER REFERENCES

Karrer et al.: Helv. Chim. Acta 34, 1408–11 (1951).